United States Patent
Nicholson et al.

(10) Patent No.: US 7,159,872 B2
(45) Date of Patent: Jan. 9, 2007

(54) SEAL ARRANGEMENT

(75) Inventors: Richard Nicholson, Littleover (GB); James E. Forfar, Beeston (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/236,528

(22) Filed: Sep. 28, 2005

(65) Prior Publication Data
US 2006/0061040 A1    Mar. 23, 2006

Related U.S. Application Data

(63) Continuation of application No. PCT/GB04/01115, filed on Mar. 16, 2004.

(30) Foreign Application Priority Data

Mar. 29, 2003    (GB)    ................................ 0307291.5

(51) Int. Cl.
*F16J 15/48* (2006.01)
(52) U.S. Cl. ..................... 277/355; 277/411; 415/173.3
(58) Field of Classification Search ................ 277/355, 277/411–412, 422, 424, 500; 415/173.3, 415/173.5, 174.2, 174.5, 230–231, 113, 180
See application file for complete search history.

(56) References Cited

U.S. PATENT DOCUMENTS

| | | | | |
|---|---|---|---|---|
| 5,031,922 A | * | 7/1991 | Heydrich | 277/355 |
| 5,135,237 A | * | 8/1992 | Flower | 277/355 |
| 6,267,381 B1 | * | 7/2001 | Wright | 277/355 |
| 6,343,792 B1 | * | 2/2002 | Shinohara et al. | 277/355 |
| 6,860,484 B1 | * | 3/2005 | Urlichs | 277/412 |

* cited by examiner

*Primary Examiner*—Vishal Patel
(74) *Attorney, Agent, or Firm*—W. Warren Taltavull; Manelli Denison & Selter PLLC

(57) ABSTRACT

A seal arrangement (73) is provided in which seal elements (77) incorporate passages (90) allowing an air flow to be presented to tip edges (78) of the seal elements, in order to create air suspension and diminish excessive wear. These passages (90) are created by recesses in the respective adjacent juxtaposed seal elements (77). In a seal assembly (71) a seal arrangement (73) is secured within a float chamber (70) whereby radial movement is allowed to accommodate for movements in the shaft (72). The radial movement is resisted by a bias created by air flow (86) into the float chamber (70). The air flow (86) may also be presented through the passages (90) in order to create the desired air suspension of the seal elements (77).

17 Claims, 4 Drawing Sheets

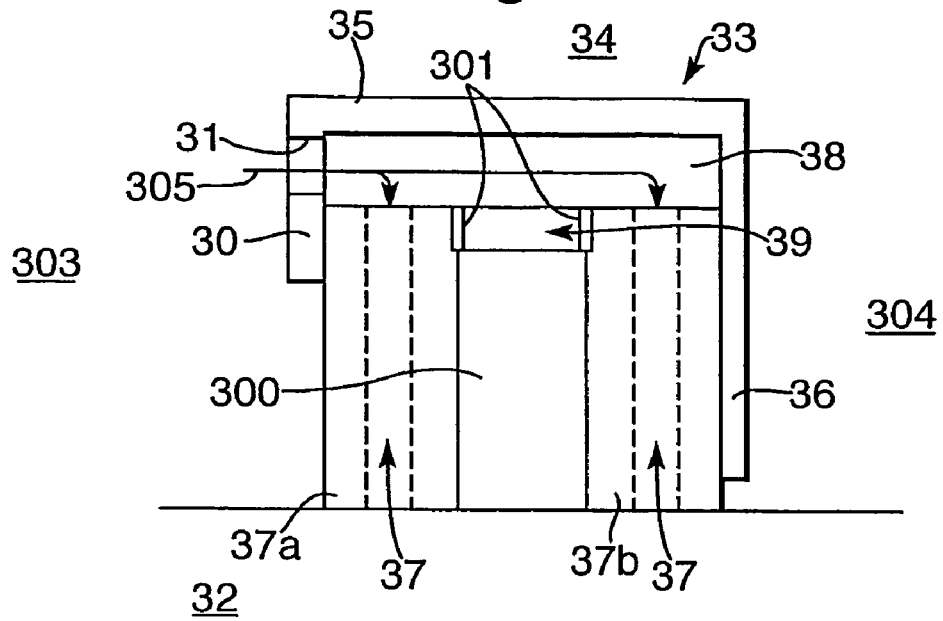
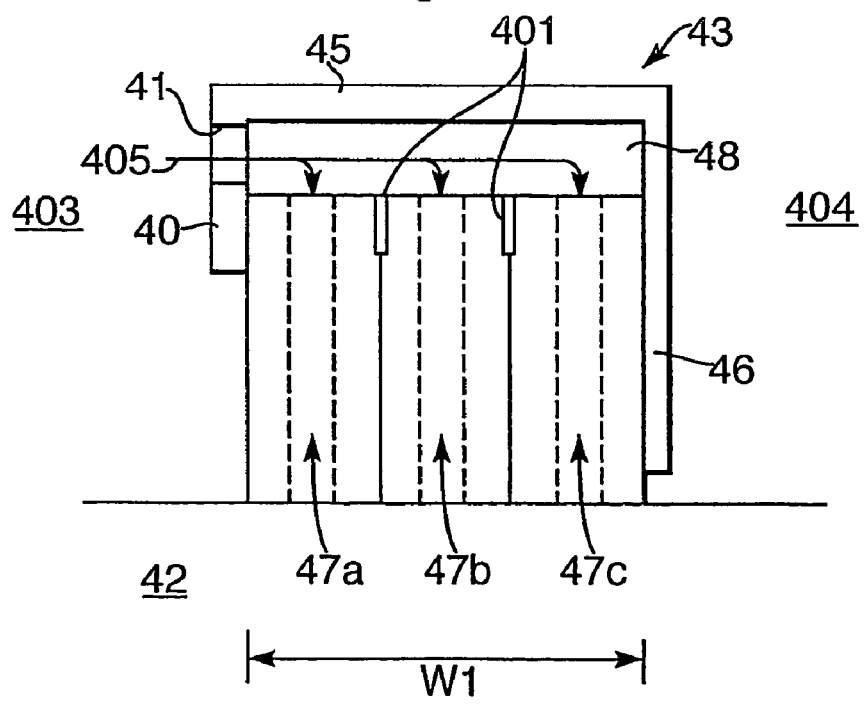

SEAL ARRANGEMENT

This is a Continuation International Appln. No. PCT/GB2004/001115 filed Mar. 16, 2004 designated the U.S.

FIELD OF THE INVENTION

The present invention relates to seal arrangements and more particularly to a seal arrangement formed from a number of leaf seal elements.

BACKGROUND OF THE INVENTION

Traditionally, brush seals have been provided in order to present a seal between two components. The brush seals essentially comprise bristles which extend from one component to another. Tip portions of each bristle contacting the other component in order to provide a seal. Such brush seals have two distinct disadvantages when presented with high differential pressures. Firstly, the bristles tend to wear rapidly and secondly, the bristles can be forced into a "locked" configuration where the bristles cannot move to accommodate excursions in the components to be sealed.

More recently the seal arrangements have been specified which relieve some of the disadvantages of brush seals. Leaf elements secured in a juxtaposed relationship replace the bristles of a brush seal. The leaf elements are compliant in a radial direction but stiff in an axial direction. In such circumstances, it is not necessary to provide a supportive backing ring as for bristles of a brush so removing the tendency for bristle seal elements to lock in position as pressure is applied. Unfortunately, such leaf seal elements are still liable to suffer from so-called "blow-down" behaviour if the pressure distribution above and below each leaf seal element is not balanced. In short, the ends of each leaf seal element rub hard onto its opposed component such as a rotating surface. In such circumstances, leaf seal elements continue to suffer from premature wear unless a balancing upward force is provided in the form of an air film between the leaf seal element tip edge and the opposed component surface e.g. rotating surface.

Previously, leaf seal elements have been provided as plain leafs. These leafs have an interleaf clearance provided by a spacing member in order to allow provision of an air film. This air film is caused by pressure in the spacing between leaf seal element. The air film is formed between leaf seal element tip edges and to the opposed component i.e. rotor. Alternatively, each seal element can be tapered from its mounting end in order to create spacing at the seal end and so the desired behaviour. Unfortunately, provision of either spacers between adjacent leaf seal elements or tapering of such leaf seal elements renders manufacture of a seal arrangement incorporating leaf seal elements difficult and the eventual seal arrangement is relatively inefficient and leaky in terms of seal effectiveness.

SUMMARY OF THE INVENTION

In accordance with the present invention, there is provided a seal arrangement for a rotating component, the arrangement comprising a plurality of leaf seal elements serially mounted with respect to one another to provide a seal, the arrangement characterised in that a leaf seal element has a recess portion and the recess portion in association with an adjacent juxtaposed leaf seal element forms a passage whereby in use an air film is presented through the passage about seal edges of the respective seal elements.

Possibly, each leaf seal element incorporates a recess portion on one side. Preferably, each leaf seal element incorporates a recess portion on both sides.

Possibly, each recess portion is concaved. Alternatively, each recess portion is a rectangular channel.

Possibly, more than one recess portion is provided on the same side of each leaf seal element.

Typically, recess portions in adjacent juxtaposed leaf seal elements coincide in order to define the passage therebetween. Furthermore, advantageously, recess portions in adjacent juxtaposed leaf seal elements are reciprocally shaped. Alternatively, recess portions in adjacent leaf seal elements are differentially shaped for element flexibility and performance.

Generally, recess portions have a uniform cross-section along the length of the leaf seal element. Alternatively, the recessed portions have a variable cross-section along the length of the leaf seal element.

Possibly, the leaf seal elements are curved into serial association in order to define the seal. Alternatively, the leaf seal elements are tapered towards their respective seal edge.

Normally, the seal elements are serially mounted by securing edges either side of the recess portion at the opposite end of respective leaf seal elements to their seal edges.

Possibly, the present seal arrangement is mounted within a carriage whereby that carriage can be secured in a float chamber whereby radial displacement of the seal arrangement is resisted by a bias resistance created by an air flow presented to the float chamber. Possibly, the float chamber incorporates a retainer in order to limit lateral movement of the seal arrangement. Normally, this retainer will be secured at the back of the float chamber.

Also in accordance with the present invention there is provided a seal assembly comprising a plurality of leaf seal elements serially mounted with respect to one another to provide a seal arrangement, the seal assembly characterised in that the seal arrangement is mounted in a carriage and the carriage is confined in a float chamber whereby radial displacement of the seal arrangement is allowed, the float chamber in use receiving an air flow to provide a bias resistance to such radial displacement.

Preferably, a retainer is provided within the seal assembly to limit lateral movement. Typically, the retainer is secured at the back of the float chamber.

Normally, the seal arrangement in the seal assembly is as defined in the paragraphs defined above. Generally, the air flow which provides in use the bias resistance also is presented to the passage defined by the recess portion or portions.

BRIEF DESCRIPTION OF THE DRAWINGS

Embodiments of the present invention will now be described by way of example with reference to the accompanying drawings in which;

FIG. 3 is a schematic cross-section of a seal arrangement in accordance with a first embodiment of the invention;

FIG. 4 is a schematic cross-section of a seal arrangement in accordance with a second embodiment of the invention;

DETAILED DESCRIPTION OF THE INVENTION

Figure 1:
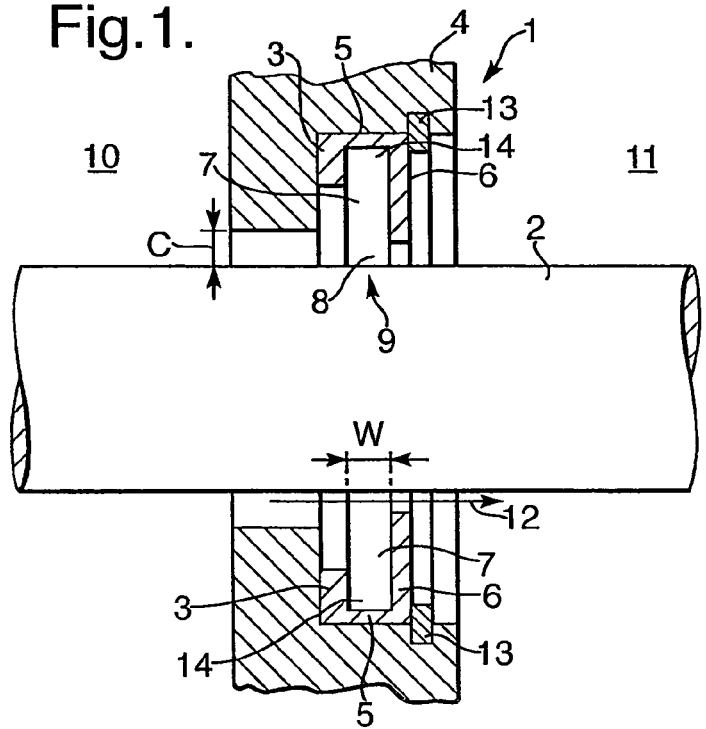
FIG. 1 is a schematic cross-section of a seal assembly incorporating a seal arrangement in accordance with the present invention.

FIG. 1 is a schematic cross-section of a seal assembly 1 in accordance with the present invention arranged to provide a seal around a shaft 2. The seal assembly 1 incorporates a seal arrangement 3 secured within a housing 4. The seal arrangement 3 comprises a mounting 5 incorporating a back plate 6 within which a number of seal elements 7 are secured such that tip edges 8 of those elements 7 engage a surface 9 of the shaft component 2 in order to create the desired seal. Generally, the housing 4 will be part of a wall between respective chambers 10, 11. Furthermore, these chambers 10, 11 will be at differential pressures. Thus, the chamber 10 will be at a high pressure and the chamber 11 at a lower pressure such that the seal arrangement 3 and in particular the seal created by engagement between the tip edges 8 and the surface 9 retains that pressure differential. In such circumstances, there is a sealing direction 12 which illustrates lateral pressure on the element 7. In such circumstances, the backing plate 6 is provided in order to resist backward deflection of the elements 7 in the direction 12. Generally, a lock member such as a circlip 13 is provided in order to secure the seal arrangement 3 within a cavity of the housing 4.

It will be noted that a clearance gap C is provided to allow for radial excursions of the shaft 2. It is such excursions which as indicated previously, cause excessive wear upon the tip edges 8 of the seal element 7.

The seal arrangement 3 must incorporate with regard to the seal element 7 a sufficient seal width W to ensure an appropriate seal is presented about the shaft 2. The width W will generally be determined by the performance of the seal elements 7 along with the expected pressure differential between the chambers 10, 11. The seal element 7 although depicted as a block comprises a number of distinct seal elements appropriately secured together about a mounting end 14 of each seal element. In such circumstances, as each seal element is generally in the form of a leaf relative movement between the seal elements and their tip edges 8 is allowable. Such relative movement creates a compliability in order to form the desired seal about the shaft 2. It is achieving this compliability in the tip edges 8 which achieves the sealing function. If the tip edges 8 were substantially rigid then provision of a seal is not achieved and the effect would simply be of a bearing supporting the shaft 2. It is achieving this compliability without excessive wear and lock which is the purpose of the present invention.

As indicated previously, creation of a positive air film or cushion layer between the tip edges 8 and the surface 9 of the shaft 2 will achieve the objective sealing function whilst reducing wear. Previously, this air film or cushion was achieved utilising specific spacers between leaf seal elements or assembling tapered seal elements in order to create a space between adjacent seal elements in series. Such arrangements are difficult to manufacture, assemble and potentially still relatively leaky in terms of effective seal performance. Provision of spacers will also increase the necessary space to accommodate the seal assembly.

Figure 2:
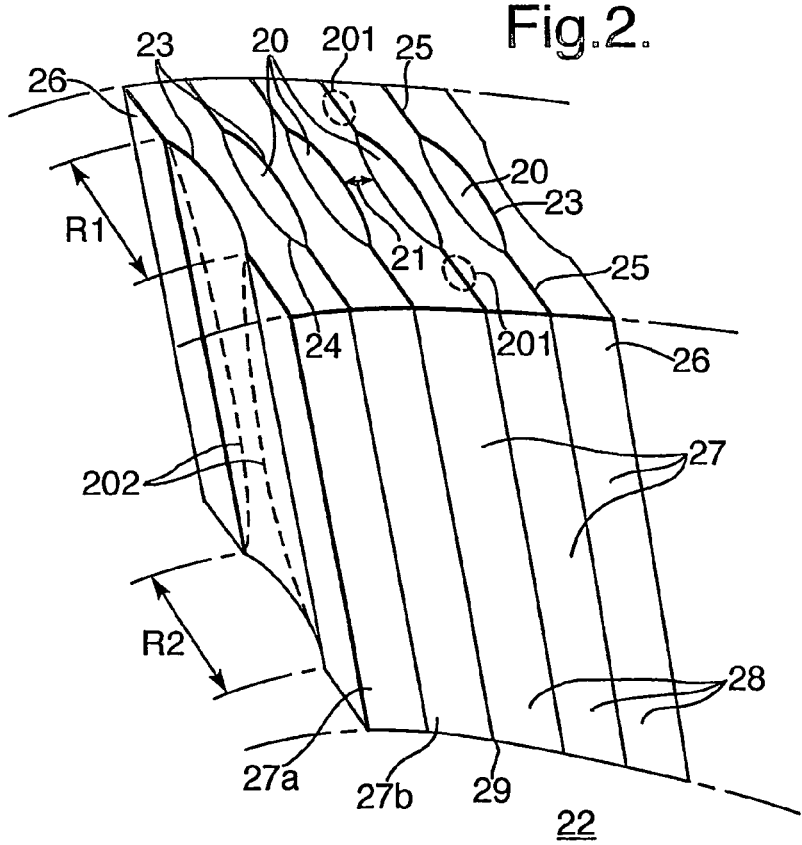
FIG. 2 is a part perspective view of one possible type of seal element in accordance with the present invention.

FIG. 2 illustrates part of a seal element combination in accordance with one embodiment of the present invention. Thus, leaf seal elements 27 are secured together in series about a shaft 22 and associated with a shaft surface 29 in order to create a seal. The seal elements 27 are incorporated within a mounting (not shown) in a similar fashion to that described in FIG. 1 but with that mounting incorporating appropriate conduits for presentation of air flows into passages 20.

These passages 20 are created by juxtaposed positioning between recess portions 23, 24 in each seal element 27. Thus, as illustrated with respect to seal elements 27a, 27b respective recess portions 23, 24 oppose one another in order to create the passage 20. Generally, as indicated previously, the seal elements 27 are secured through mountings 25 at mounting ends 26 of each element 27.

The depth of the recess portions 23, 24 will be determined by the materials from which the elements 27 are made, expected pressure differential presented to the seal arrangement and the necessity to maintain structural integrity. If the recess portions 23, 24 penetrate too deeply the seal elements 27 may have a waist width 21 which is too narrow whilst too little depth in the recess portions 23, 24 will render the passage 20 created as too narrow for effectiveness in accordance with the present invention. The leaf seal elements 27 must retain their desired objective sealing function.

Normally, as illustrated in FIG. 2 the seal elements 27 may incorporate recess portions 23, 24 on both sides of the seal element 27. However, it may be possible to provide a flat back side to a seal element 27 such that a passage is formed solely by a recess portion in the adjacent juxtaposed seal element. Additionally, where feasible more than one passage may be created between adjacent juxtaposed seal elements such as shown by broken lines 201. Furthermore, although illustrated in FIG. 2 with a consistent cross-section through the length of the seal elements 27 it may be desirable to provide for varying cross-section in the passage 20 and therefore recessed portions 23, 24. For example, the recess portions could be waisted as shown by broken lines 202 or arranged to expand or contract between the recess portion width R1 at the mounting end 26 and R2 at the tip edge 28 of the seal elements 27. Such arrangements may be used for controlling air flow and therefore presentation of that air flow about the tip edges 28 in accordance with the present invention, but in themselves would render the assembly and machining of the respective seal elements 27 more complicated.

In accordance with the present invention, a seal arrangement is constructed of leaf seal elements of rolled cross-section which provide a passage between adjacent juxtaposed leaves into which air is fed at the outer circumference to flow inwards in order to create the desired air film or cushion between the tip edges and rotating surface. The leaf seal elements are welded at the outer diameter of the seal arrangement, typically at their corners. A plenum chamber above the mounting ends is provided which is fed with an air flow in order to supply the respective passages which in turn create the air film and so air suspension of the tip edges as desired in accordance with the present invention.

The leaf seal elements can be stacked either with an axial gap as depicted in FIG. 3 or closely packed as depicted in FIG. 4. FIG. 3 illustrates a labyrinth style seal arrangement 33 in accordance with the present invention as a schematic cross-section. Thus, the seal arrangement 33 includes leaf elements 37 defined as rows 37a and 37b. These leaf seal elements 37 are secured in a mounting 35 with a back plate 36 and a front plate 30 incorporating perforations 31 in order to feed an air flow to a plenum chamber 38 above the seal elements 37.

In use, tip edges of the seal elements 37 engage a surface of a shaft 32 and the mounting 35 and therefore seal arrangement 33 is secured within a housing 34. A spacer element 39 is provided in order to create a space 300 between the seal elements 37. The seal elements 37 are secured to the spacer 39 through fixings 301 with the result that a labyrinthine pathway is created incorporating the seal elements 37 and the spacing 300. As described previously, a seal is created between tip edges of the seal elements 37 and the surface of the shaft 32. In such circumstances, in order to pass from a high pressure side 303 to a low pressure side 304 it is necessary to traverse both the seal elements rows 37a and 37b as well as the spacing 300. In such circumstances, a direct path is not provided and therefore there is a labyrinthine traversal is required inhibiting leakage across the seal arrangement 33 between the high pressure side 303 and the low pressure side 304.

In accordance with the present invention, an air flow 305 is presented through the perforations 31 into the plenum 38. This air flow then moves radially inwards through passages (not shown) towards the tip edges of the seal element rows 37a, 37b in order to create the air film and therefore suspension desired in order to inhibit excessive wear of the seal elements 37.

FIG. 4 illustrates in schematic cross-section a second embodiment of the present invention in which a seal arrangement 43 is provided. This seal arrangement 43 comprises seal elements 47 secured in seal element rows 47a, 47b, 47c. The seal elements 47 are secured within a mounting 45 which comprises a front plate 40 with perforations 41 and a back plate 46. A plenum 48 is created above the seal elements 47. The seal element rows 47a, 47b, 47c are secured together through fixings 401 in order to present tip edges of the respective seal elements to a surface of a shaft 42. The mounting 45 and therefore the seal arrangement 43 is secured within a housing 44 such that the seal arrangement provides a seal between a high pressure side 403 and a low pressure side 404.

In accordance with the present invention, an air flow 405 is presented through the perforations 41 into the plenum 48. This air flow 405 is then presented through passages (not shown) towards the tip edges of the seal elements 47 in order to create suspension as described previously and so limit wear upon the seal elements 47. By arranging the seal elements 47 in rows 47a, 47b, 47c it will be appreciated that the seal width W1 is extended by provision of the closely packed seal elements 47 in the arrangement 43. Each row 47a, 47b, 47c comprises a series combination of individual sealing elements 47 which extend radially about the shaft 42 as a sealing collar and the rows 47a, 47b, 47c are then joined through the fixings 401 in order to create the greater sealing width W1 in comparison with each individual row 47a, 47b, 47c. In such circumstances, a greater sealing width W1 can be created without the necessity of manufacturing individual sealing elements of that same width W1. However, where possible and economical wider sealing elements could be provided with individual passages (not shown) in order to create the desired suspension of the tip edges. Furthermore, slits could be provided at positions equivalent to the adjacent edges of the rows 47a, 47b, 47c in order to maintain the tip edge flexibility desirable in order to achieve compliance with the surface of the shaft 42 and therefore achieve a desired sealing effect.

Figure 5:
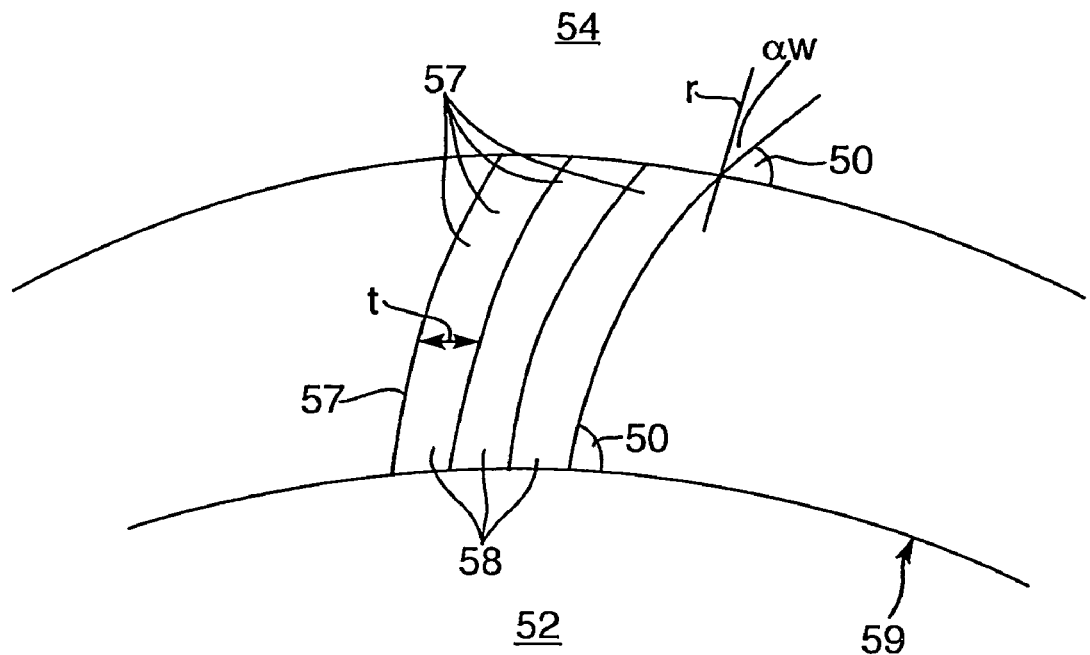
FIG. 5 is a partial side view of curved seal elements in accordance with the present invention.
Figure 6:
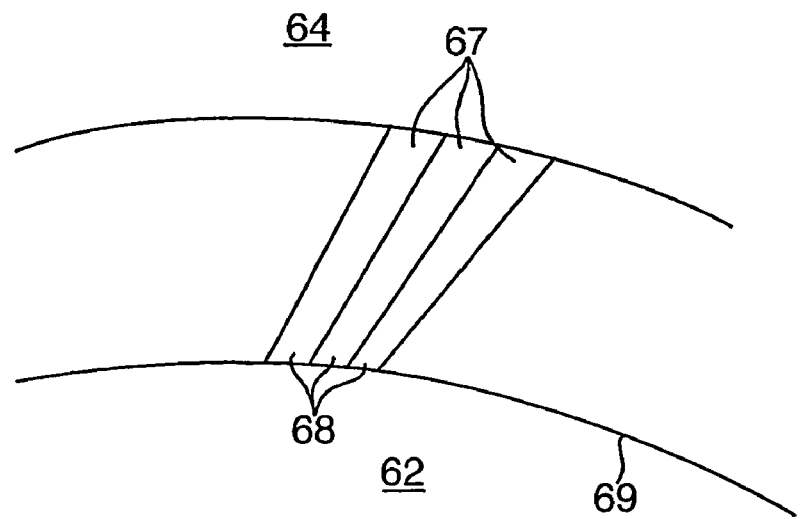
FIG. 6 is a part side view of tapered seal elements in accordance with the present invention.

As indicated above, the seal elements in accordance with the present invention are generally secured in series as a collar around a rotating shaft surface. FIGS. 5 and 6 illustrate alternative arrangements by which those seal elements can be secured. In FIG. 5 seal elements 57 are illustrated which extend from an outer mounting edge to a tip edge in a curved configuration. The mounting edge as indicated previously will typically be secured within a mounting (not shown) and the sealing element 57 secured at this end through an appropriate fixing. The tip edges 58 will engage a rotor 52 surface in order to provide a seal. In such circumstances, the seal elements 57 have a substantially constant cross-section so that when curved at any radius along the respective length the element 57 presents an angular dimension 50 to the rotor surface 59 which is substantially the same. This is achieved by ensuring that the ratio of sealing element thickness T divided by the cosine of the angle α it makes at any radial direction R is proportional to R. The seal elements 57 are welded to the mounting component 54 at an angle of α at the mounting ends and this angle α will decrease as the sealing elements 57 extend inwards. By such an arrangement the seal elements 57 are parallel such that there is a minimal clearance between the elements 57 along their length and leakage minimised. It should be appreciated that passages in accordance with the present invention are provided between adjacent surfaces of the seal elements 57 in order to create the air flow suspension as described previously. Clearly, with such passages it is not necessary to provide clearance between the seal elements 57 in order to create the air film desired for suspension as described previously.

FIG. 6 illustrates an alternative serial arrangement of seal elements 67 again secured between a shaft 62 and a mounting 64. In the embodiment depicted in FIG. 6 the seal elements 67 are tapered from an outer mounting end to a tip edge end 58. By such means the greater radius of the mounting ends of the seal element 67 in comparison with the tip edge ends 58 abutting the rotor surface 59 is accommodated without gaps between adjacent juxtaposed sealing elements 67 other than the passages as described previously within which air flow is presented to achieve the desired suspension relative to the surface 69.

As described previously, it is desirable to allow a seal arrangement to accommodate large radial movements. The large radial movements may be due to shaft movements within the seal. In such circumstances, also in accordance with an embodiment of the present invention a seal arrangement is allowed to float within a mounting carriage.

Figure 7:
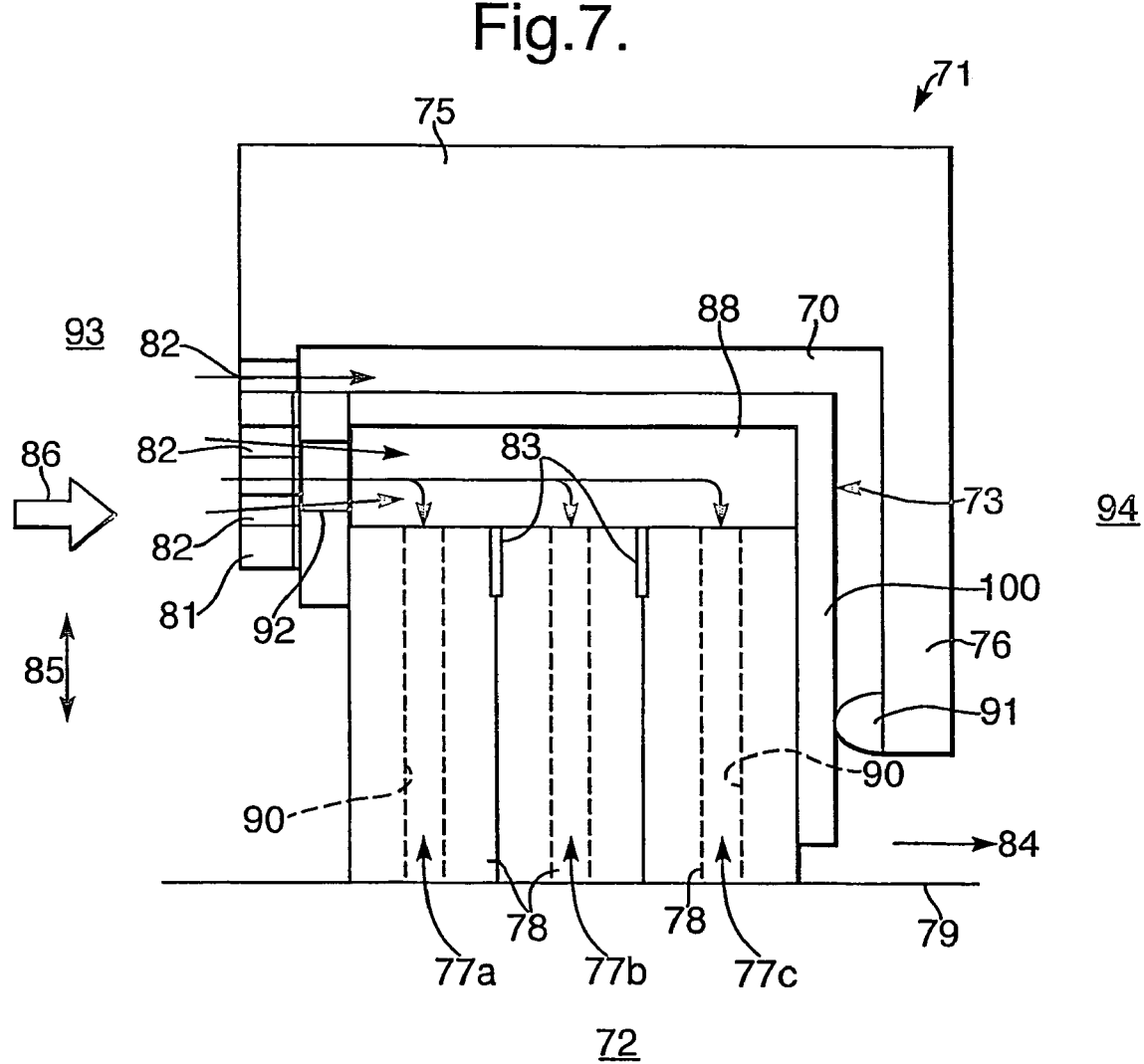
FIG. 7 is a schematic cross-section of a floating seal assembly in accordance with the present invention.

FIG. 7 is a schematic cross-section of such a floating seal assembly 71 in accordance with the present invention. Thus, a seal arrangement 73 is located within a float chamber 70 created within a mounting 75. The mounting 75 incorporates a front plate 18 with perforations 82 and a back plate 76. The seal arrangement 73 is essentially retained within the float chamber 70 such that seal elements 77 depicted in rows 77a, 77b, 77c are secured together through fixings 83 with tip edges 78 engaging a surface 79 of a rotor 72. The elements are held in that relationship by a carriage 100. The mounting 75, itself, is secured within normally a housing component. Above the seal elements 77 a plenum 88 is provided. In such circumstances, lateral movement in a sealing direction 84 is resisted by the back plate 76 whilst radial movement in the direction of arrowheads 85 is allowed within the float chamber 70. In such circumstances radial movements by the seal arrangement 73 due to movements of the shaft 72 in operation can be accommodated without excessive wear on the tip edges 78.

In accordance with the present invention, an air flow 86 is presented to the perforations 82 such that that air flow 86 passes into a float chamber 70 as well as the plenum 88. Within the plenum 88 the air flow as described previously passes through passages 90 in order to create the desired air film suspension between the tip edges 78 and the surface 79 of the shaft 72. The air flow 86 also as indicated above passes into the float chamber 70 in order to create a bias resistance to radial movements of the seal arrangement 73 in the direction of arrow heads 85. Clearly, this bias resistance is limited to the air pressure of the air flow 86 and so can be appropriately regulated dependent upon the desired compressive force to achieve a seal between the edges 78 and the surface 79. Normally, as indicated the air flow 86 will feed both the float chamber 70 and the plenum 88 such that there is an association between the air flow pressure presented through the passages 90 for suspension of the seal elements 77 relative to the rotating surface as well as the resistance to radial movement of the whole seal arrangement 73.

As indicated previously, a back plate 76 is provided in order to resist lateral movement in the direction 84. This back plate 76 may include an elastomeric stopper 91 which acts to hold the seal arrangement 73 in compressive engagement with a back surface of the front plate 81. Nevertheless, it will be appreciated that by appropriate choice of the compressive resistance of that back stop 91 it may be possible to de-couple direct air flow 86 through the perforations 82 into perforations 92 of the seal arrangement 75 such that there is air flow 86 leakage therebetween and consequently bias resistance loss to radial movement of the seal arrangement 73 within the flow chamber 70 as well as the air flow through the passages 90 in order to create suspension is diminished.

Although described as having the seal edge suspended relative to the rotating surface it will also be understood that the rotating component is also suspended by the air film through the passages between the seal edges.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A seal arrangement for a rotating component, the arrangement comprising a plurality of leaf seal elements serially mounted with respect to one another to provide a seal, each leaf seal element having two sides the arrangement characterised in that at least some of said leaf seal elements have a recess portion, a first edge and an opposite edge with said recess portions extending between said first and second edges so that a said recess portion in association with an adjacent juxtaposed leaf seal element having a recess portion forms a passage whereby in use an air film is presented through the passage about seal edges of the respective seal elements.

2. An arrangement as claimed in claim 1, characterised in that each leaf seal element incorporates a recess portion on one side.

3. An arrangement as claimed in claim 1, characterised in that each leaf seal element incorporates a recess portion on both sides.

4. An arrangement as claim in claim 1 characterised in that each recess portion is concave.

5. An arrangement as claim in claim 1 characterised in that each recess portion is a rectangular channel.

6. An arrangement as claimed in claim 1, characterised in that more than one recess portion is provided on that same side of each leaf seal element.

7. An arrangement as claimed in claim 3 characterised in that recess portions in adjacent leaf seal elements coincide in order to define the passage therebetween.

8. An arrangement as claimed in claim 7, characterised in that recess portions in adjacent leaf seal elements are reciprocally shaped.

9. An arrangement as claimed in claim 7, characterised in that recess portions in adjacent leaf seal elements are differentially shaped for element flexibility and performance.

10. An arrangement as claimed in claim 1, characterised in that each recess portion has a uniform cross-section along the length of the leaf seal element.

11. An arrangement as claimed in claim 1, characterised in that each recess portion has a variable cross-section along the length of the leaf seal element.

12. An arrangement as claimed in claim 1, characterised in that the leaf seal elements are curved into serial association in order to define the seal.

13. An arrangement as claimed in claim 1, characterised in that the leaf seal are tapered towards their respective seal edges.

14. An arrangement as claimed in claim 1, characterised in that the leaf seal elements are serially mounted by securing edges either side of the recess portion at the opposite end of respective leaf seal elements to their seal edges.

15. An arrangement as claimed in claim 1, characterised in that the seal arrangement is mounted within a carriage whereby the carriage can be secured in a float chamber whereby radial displacement of the seal arrangement is resisted by a bias resistance created by an air flow presented to the float chamber.

16. An arrangement as claimed in claim 15 wherein the float chamber incorporates a retainer in order to limit lateral movement of the seal arrangement.

17. A seal arrangement for a rotating component, the arrangement comprising a plurality of leaf seal elements serially mounted with respect to one another to provide a seal, the arrangement characterized in that a leaf seal element has a recess portion and the recess portion in association with an adjacent juxtaposed leaf seal element having another recess portion that forms a passage whereby in use an air film is presented through the passage about seal edges of the respective seal elements wherein the recess portions in adjacent leaf seal elements coincide in order to define the passage therebetween.

* * * * *